UNITED STATES PATENT OFFICE.

AUGUSTUS CHARLES HYDE, OF PERIVALE, ENGLAND.

MEANS TO BE EMPLOYED IN THE ELECTRIC WELDING OF IRON OR STEEL OR ALLOYS THEREOF.

1,341,558.  Specification of Letters Patent.  Patented May 25, 1920.

No Drawing.  Application filed November 25, 1919. Serial No. 340,444.

*To all whom it may concern:*

Be it known that I, AUGUSTUS CHARLES HYDE, a subject of the King of Great Britain, residing at Perivale Lodge, Perivale, in the county of Middlesex, England, have invented new and useful Improvements in Means to be Employed in the Electric Welding of Iron or Steel or Alloys Thereof, of which the following is a specification.

My invention consists in a modification of the process and product of manufacture described in the specification of my Patent No. 1,323,768, dated December 2, 1919, by which modification wires, or other suitable forms, of iron, or steel, or alloys thereof, are covered with a flux of a vitreous or semi-vitreous, character.

In carrying out my invention as described in the specification of my aforesaid application difficulty may occur owing to a flux which has a temperature co-efficient suitably approximate to that of the electrode, so as to adhere closely to it, also forming, under the electric arc, a slag which adheres closely to the solidified metal, or alloy, at the weld and is difficult to detach.

According to my present invention I overcome this difficulty as follows:—

I take a mixture of materials suitable for use as a flux, or deoxidizer, in welding iron, or steel, or an alloy thereof; such, for instance, as asbestos and a sufficiently fusible body, such as soluble silicate of soda, both in powdered condition. This mixture is made into a magma with hot water, or other suitable liquid, into which the wires, or other suitable forms, of iron, or steel, or alloy thereof, are dipped, and withdrawn and dried and then heated to a temperature of say from about 700°, to about 800° centigrade. A suitable mixture of asbestos and silicate of soda is in the proportion of from about 10, to about 20, per cent. of the soluble anhydrous silicate of soda, to from about 90, to about 80, per cent. of asbestos. By careful regulation of the final temperature the silicate of soda contained in the mixture becomes fused causing the whole mixture to become semi-vitrified and so adherent to the core of iron, or steel, or alloy thereof, that it will not be readily detached therefrom; but, when this flux mixture is subsequently raised to a higher temperature in the welding operation so as to be completely fused in the electric arc, a change occurs in the constitution of the mixture which alters its temperature co-efficient so that the slag which it then forms does not adhere closely to the iron, or steel, or alloy thereof, upon which it has flowed and can be easily detached therefrom during, or after, the welding as required. The thickness of the coating of fluxing mixture can be easily adjusted by increasing the number of the dipping operations, or by reducing the amount of water, or other liquid, employed in making the magma of asbestos and silicate of soda.

In the following claims I use the word "iron" in a sense broad enough to include not only iron, but also steel and alloys of iron and steel, while the word "wire" is used in a sense broad enough to include any suitable form of the iron, steel or alloy thereof, in which it may be desired to shape the electrode.

What I claim is:—

1. The method of preparing iron electrode welding wires which comprises coating the wire with a magma of a flux mixture, and heating the coated wire to a temperature sufficient to fuse the flux mixture thereon, but below welding heat, the composition of the flux mixture being such that at welding temperature it forms a slag which will not adhere closely to, and can be readily removed from, the welded iron.

2. The method of preparing iron electrode welding wire, which comprises coating the wire with a magma of powdered asbestos and powdered silicate of soda, and then heating the coated wire to a temperature sufficient to fuse the flux mixture thereon, but below welding heat, for the purpose described.

3. An iron electrode having a coating of flux material fused thereon which forms, at welding temperature a weakly adherent slag.

4. An iron electrode having fused thereon at a heat below welding temperature a magma of powdered asbestos and powdered silicate of soda, serving as a flux which at welding temperature forms a weakly adherent slag, substantially as described.

In testimony whereof I have signed my name to this specification in the presence of two subscribing witnesses.

AUGUSTUS CHARLES HYDE.

Witnesses:
G. F. TYSON,
RUDOLPH CHAS. NICKOL.